(12) United States Patent
Bender et al.

(10) Patent No.: US 6,600,800 B2
(45) Date of Patent: Jul. 29, 2003

(54) FUEL ELEMENT FOR A BOILING WATER NUCLEAR REACTOR

(75) Inventors: Dieter Bender, Möhrendorf (DE); Otmar Bender, Weisendorf (DE); Hans-Joachim Lippert, Höchstadt/Aisch (DE); Walter Übelhack, Erlangen (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 09/883,479

(22) Filed: Jun. 18, 2001

(65) Prior Publication Data

US 2002/0075987 A1 Jun. 20, 2002

Related U.S. Application Data

(63) Continuation of application No. PCT/EP99/09983, filed on Dec. 15, 1999.

(30) Foreign Application Priority Data

Dec. 18, 1998 (DE) .......................................... 198 58 644

(51) Int. Cl.[7] .................................................. G21C 3/32
(52) U.S. Cl. ........................ 376/435; 376/428; 376/438; 376/439; 376/440; 376/442; 376/443; 376/444; 376/447; 376/449
(58) Field of Search ................................. 376/428, 435, 376/439, 438, 440, 442, 443, 444, 447, 449

(56) References Cited

U.S. PATENT DOCUMENTS

| | | | | |
|---|---|---|---|---|
| 4,957,698 A | * | 9/1990 | Ritter | |
| 5,174,949 A | * | 12/1992 | Johansson | |
| 5,229,068 A | | 7/1993 | Johansson et al. | .......... 376/371 |
| 5,388,132 A | * | 2/1995 | Aoyama et al. | |
| 5,420,902 A | * | 5/1995 | Dressel et al. | |
| 5,875,224 A | * | 2/1999 | Smith et al. | |
| 5,878,100 A | * | 3/1999 | Johannesson et al. | |
| 6,347,130 B1 | * | 2/2002 | Nylund | |
| 6,353,652 B1 | * | 3/2002 | Helmersson | |
| 6,434,210 B1 | * | 8/2002 | Masumi | |

FOREIGN PATENT DOCUMENTS

| | | |
|---|---|---|
| EP | 0 517 728 B1 | 12/1992 |
| EP | 0 517 750 B1 | 12/1992 |
| EP | 0 619 581 A1 | 10/1994 |
| EP | 0 632 469 A1 | 1/1995 |
| EP | 000632469 * | 1/1995 |
| JP | 63-149592 * | 6/1983 |
| JP | 6-2021094 * | 1/1987 |
| JP | 2192690 * | 8/1987 |
| JP | 01 176 986 A | 7/1989 |
| JP | 125788 * | 10/1989 |
| JP | 404064091 * | 2/1992 |
| JP | 406003473 * | 1/1994 |

* cited by examiner

Primary Examiner—Michael J. Carone
(74) Attorney, Agent, or Firm—Laurence A. Greenberg; Werner H. Stemer; Ralph E. Locher

(57) ABSTRACT

In a boiling water fuel assembly, some of the fuel rods are shortened. It is necessary to establish a sufficiently high maximum power for transition to boiling. To optimize this power, spacers are at a constant distance at a bottom and are at a shorter distance at a top. The spacers belonging to upper group have turbulence-generating vanes which, however, do not project above the shortened fuel rods.

35 Claims, 4 Drawing Sheets

FUEL ELEMENT FOR A BOILING WATER NUCLEAR REACTOR

CROSS-REFERENCE TO RELATED APPLICATION

This application is a continuation of copending International Application No. PCT/EP99/09983, filed Dec. 15, 1999, which designated the United States.

BACKGROUND OF THE INVENTION

Field of the Invention

The invention relates to a fuel assembly, in particular for a boiling water nuclear reactor, having a fuel assembly channel which is open at the top and bottom as cladding around a multiplicity of fuel rods which are supported with respect to one another and on the fuel assembly channel by spacers.

For fuel assemblies for boiling water nuclear reactors, it is necessary to be at a sufficiently great distance from what is known as the maximum power for transition to boiling. In this context, the maximum power for transition to boiling is the power at which the formation of steam in the fuel assembly does not yet cause the quantity of heat dissipated to the coolant to be reduced. If the maximum power for transition to boiling is exceeded, a film or even a layer of steam forms on the surface of fuel rods contained in the fuel assembly, and this represents a resistance to heat transfer. Since the quantity of heat generated in the fuel rod is then temporarily no longer completely dissipated, the temperature of the fuel rod rises, until a new thermal equilibrium is established. This may lead to the fuel rod overheating and therefore to thermal overloading of a fuel rod cladding tube. Overheating of this nature must be avoided at all costs, since it would shorten the service life of the fuel rod and therefore of the fuel assembly.

It is known from European Patent EP 0 517 750 B1 to increase the cooling of the fuel rods by segregating water droplets and steam. In this case, the water droplets are diverted, by vanes on the top side of the spacers, out of the center of a sub-channel for a coolant, which is formed by four fuel rods, onto the surface of the fuel rods, while the steam continues to flow upwards in the center of the sub-channel.

However, vanes of this type cannot in fact be disposed in the steam region, (i.e. the upper region of the boiling water fuel assembly, where a considerable part of the cooling water is already present in the form of steam, i.e. the "two-phase region") without having an adverse effect on the hydraulic stability of the flow of coolant. This is because the spacers increase the pressure loss in the two-phase region. In addition to an undesirable reduction in the water throughput as a result of a pressure loss being caused by a fuel assembly with additional internal fittings of this type, the increase in volume which occurs during evaporation prevents the coolant from flowing out. If these negative effects are to be reduced or eliminated altogether, the pressure loss in the two-phase region has to be reduced. Such a reduction can be achieved, inter alia, by enlarging the cross section of flow. The cross section of flow can be enlarged by providing empty positions in the fuel rod grid (see EP 0 517 728 B1). For these reasons, hitherto part-length fuel rods have been used, while vanes of this type have not been deployed. Moreover, the resultant empty positions in the upper fuel assembly region contribute to improving the shutdown performance.

Although shortening some rods reduces the fuel volume in the upper region of the fuel element, it does significantly improve the moderator/fuel ratio and the fuel that is enclosed in the long fuel rods burns more successfully.

It is known that in this case the maximum power for transition to boiling, which is determined by the remaining long rods, decreases. It is stated in Japanese Patent Application JP 1-176986 A (1989) that the enlarged cross section of flow and the correspondingly lower flow resistance leads to a velocity profile of the coolant according to which the film of water flows down the fuel rod surface more slowly and therefore evaporates more quickly, i.e. already contributes to a lower heating power for transition to boiling. Therefore, it is proposed in this document to increase the flow resistance of the spacers which lie above the ends of the part-length rods. This can be achieved by thicker grid webs of the spacers or by protrusions (for example bent-off bottom edges of the grid webs) which project into the space that lies above the shorter fuel rods.

For the same reasons, U.S. Pat. No. 5,229,068 proposes that the upper spacers be constructed from higher webs or for the distances between the spacers to be reduced. Displacement bodies or helically twisted sheet-metal strips above the part-length fuel rods are also intended to completely or partially compensate for the reduction in the flow resistance, so as to restore the original pressure conditions. Above all, it is recommended for the number of spacers in the upper part of the fuel assembly to be increased, i.e. for the distance between the spacers to be reduced continuously or in steps. The greater flow resistance is regarded as a precondition for achieving a higher power for transition to boiling.

However, the hydraulic conditions which are required for sufficient cooling can considerably impair a greater flow resistance and therefore prevent the use of a fuel assembly of this type even if a higher power for transition to boiling were to be possible.

Even other experiments have failed to show a clear relationship between the power for transition to boiling and the flow resistance. Rather, measures are required which enable the remaining long fuel rods, the power of which is high on account of the favorable moderator/fuel ratio, to be effectively cooled without the pressure loss being increased excessively. This is the object of the invention.

SUMMARY OF THE INVENTION

It is accordingly an object of the invention to provide a fuel element for a boiling water nuclear reactor which overcomes the above-mentioned disadvantages of the prior art methods of this general type, in which fuel rods are effectively cooled without a pressure loss being increased excessively.

With the foregoing and other objects in view there is provided, in accordance with the invention, a fuel assembly for a boiling water nuclear reactor. The fuel assembly contains a multiplicity of fuel rods having top ends, bottom ends and a fuel assembly channel having a top, a bottom, and openings formed therein at the top and the bottom, The fuel assembly channel encloses the fuel rods. Spacers are connected to the fuel assembly channel and support the fuel rods with respect to one another and on the fuel assembly channel. The spacers are divided into a lower group having identical vertical distances from one another and, an upper group having vertical distances which at least differ from the identical vertical distances of the lower group. A mean distance between the spacers in the upper group is smaller than a mean distance between the spacers in the lower group. Some of the fuel rods are shorter fuel rods being shorter than others of the fuel rods and the shorter fuel rods end below at least two of the spacers. At least some of the spacers of the upper group have an upper side and vanes disposed on the upper side. The vanes are bent obliquely into a flow of a coolant flowing upward between the fuel rods and imparting a turbulence to the flow of the coolant, and none of the vanes projecting into a space which lies above the shorter fuel rods. A lower rod-holding plate is disposed in the fuel assembly channel such that the bottom ends of the fuel rod lie practically at a same height as the lower rod-holding plate.

The invention therefore provides for, in the region of the boiling water fuel assembly which lies above the shorter fuel rods, vanes to be disposed on the top edges of the spacer webs and the number of spacers to be increased (i.e. the distance between the spacers to be reduced) compared to the number of spacers which would result if the spacers were to be disposed at the same distance as in the lower region of the fuel assembly. The vanes are bent obliquely into the flow of coolant flowing along the long fuel rods, in such a manner that they impart turbulence to the flow of coolant, the turbulence guiding the liquid water onto the fuel rods under centrifugal force and keeping the steam away from the surface. This leads to a thicker film of water on the fuel surfaces yet the bent-over vanes do not project so far into the flow of coolant as to protrude into the space above the shorter fuel rods. Therefore, the rapid outgoing flow of steam is virtually unimpeded.

On account of the configuration of the upper spacers and their vanes, the distance between the spacers in the two-phase region becomes a parameter that enables the power for transition to boiling and the pressure loss to be simultaneously optimized.

According to the invention, therefore, the spacers in the lower group are disposed at identical vertical distances from one another, while the spacers in the upper group are disposed at vertical distances which are shorter (at least on average). The lower ends of all the fuel rods lie at one level (for example they may be supported at the bottom on a lower rod-holding plate which is common to all the fuel rods), but some of the fuel rods are shortened and end above spacers above that there are advantageously still at least two spacers. At most the fuel rods which are not shortened are supported on an upper rod-holding plate. In this context, the distance of the bottom and top spacers from the respectively adjacent spacers is not taken into consideration.

Advantageously, the distances between the spacers belonging to the upper group become shorter from the bottom upward; however, it may even be advantageous if the upper group includes two distances that are different from one another and from the constant distance in the lower group.

This is because the fuel rods are set in transverse vibrations by the flow of coolant, and the transverse vibrations are damped by the fuel rods being clamped in the mesh openings of the spacers. If this clamping takes place in planes that are at constant distances from one another, however, pronounced characteristic vibrations are formed with vibration nodes in these planes. However, the characteristic vibrations are detuned and damped if the distances between the spacer planes differ.

In accordance with an added feature of the invention, the spacers include a bottom spacer and a top spacer. A first distance between the bottom spacer and an adjacent next one of the spacers is not taken into consideration, and a second distance between the top spacer and an adjacent next one of the spacers is also not taken into consideration.

The position of the spacers is advantageously determined in such a way that the upper end of each shorter fuel rod is supported virtually directly in a mesh opening of a spacer. In the case of boiling water fuel assemblies, the characteristic vibrations are excited particularly in the lower region, in which only liquid water is flowing, and in this region the friction between the fuel rods and the grids—with the risk of damage to the fuel rods—is reduced if the fuel rods are clamped in place at the constant distances of the vibration nodes. In this case, the characteristic vibration is advantageously damped by different distance planes in the upper part of the fuel elements, where the flowing water/steam mixture does not excite the transverse vibrations so strongly.

According to expedient refinements of the invention, only the shortened fuel rods are anchored in the lower rod-holding plate and/or the distances in the upper group of spacers decrease by 10% to 30% from spacer to spacer (based on the distance between the spacers belonging to the lower group). In particular, the shortened fuel rods end just above spacer grids, advantageously, in the case of some fuel rods, in the transition region from the lower group of spacers to the upper group of spacers.

Advantageous configurations of the invention consist in the identical distances between the spacers of the lower group being either 500 to 580 mm, in particular 512 or 568 mm, and the distances in the upper group of spacers decreasing from 500 mm to 359 mm, in particular 410 to 350 mm, 400 to 359 mm, 500 to 390 mm or 450 to 320 mm. It is possible to provide fuel rods with three or four different lengths. Generally, in each case two to five spacers belong to both the lower group and the upper group of spacers.

Further configurations of the invention are achieved by the fact that the spacers contain metal strips which are disposed at right angles to one another, penetrate through one another, form approximately square mesh openings and clamp the fuel rods which have been pushed through the mesh openings resiliently in the horizontal direction. In the upper group, the sheet-metal vanes are positioned next to the penetration locations of the metal strips, on the upper edge of the strips. The vanes imparting in each case turbulent impulses to the coolant flowing vertically through the spacer at adjacent penetration locations, around the penetration locations, (preferably oppositely directed turbulence impulses), and that at each penetration location of the metal strips at least two (advantageously four) sheet-metal vanes are provided.

The vanes are formed in particular by integral parts of the sheet-metal strips (spacer webs). Fuel assemblies according to the invention can also be produced by connecting the side walls of hollow cylindrical sleeves to one another as spacer webs and by the sleeves bearing sheet-metal vanes at their upper ends. The vanes impose a corresponding turbulent impulse on a coolant flowing through between adjacent sleeves.

In accordance with an additional feature of the invention, all of the spacers of the lower group have metal strips disposed at right angles to one another, penetrate through one another, form approximately square mesh openings and clamp the fuel rods which have been pushed through the square mesh openings, resiliently in a horizontal direction.

In accordance with another feature of the invention, the spacers disposed above the shortest fuel rods contain the metal strips disposed at right angles to one another, penetrate through one another, form the approximately square mesh openings and clamp the fuel rods which have been pushed through the mesh openings resiliently in a horizontal direction. The spacers disposed above the shortest fuel rods having the vanes disposed next to penetration locations of the metal strips, on an upper edge of the metal strips.

Fuel assemblies that are configured in accordance with the invention are highly advantageous since they increase the maximum power for transition to boiling without impairing safety and with a relatively low outlay, and also without causing unacceptable nuclear, thermohydraulic or mechanical loads.

In accordance with a further feature of the invention, the spacers are formed of hollow cylindrical sleeves having side walls and they are connected to one another by the side walls. The hollow cylindrical sleeves have upper ends and vanes disposed at the upper ends only at the spacers belonging to the upper group.

The cross section of the fuel assembly channel and of the spacers disposed therein is square in most boiling water fuel assemblies. In this case, a (cylindrical or in particular square) coolant tube is advantageously disposed in the center of the fuel assembly, and this tube also guides liquid cooling water (moderator) in the upper region of the fuel assembly, where it therefore increases the density of the moderator. The fuel rods are in this case disposed in a regular square pattern around the coolant tube, i.e. the spacers form mesh openings which are of the same shape and size and the center points of which in each case form the corners of squares.

Fuel assemblies which have a cross-shaped coolant tube that breaks the channel cross section down into four squares or a configuration containing a plurality of coolant tubes are known. In each case, there is no fuel rod in the center of the fuel assembly channel, but rather the coolant tube configuration extends over the center and the fuel rods are disposed in a it regular square pattern around the configuration.

According to the invention, the center point of the coolant tube configuration may be offset with respect to the center of the channel in the direction of one diagonal of the channel cross section. Alternatively or in addition, the bundle of fuel rods may also be diagonally offset in this way.

In this way, it is possible to compensate for inhomogeneity in the ratio of moderator to fuel, in the burnup and in the power which results from the fuel assemblies often being disposed in the core in such a manner that an instrumentation tube containing measuring probes is adjacent to one corner of the fuel assembly, and a cross-shaped control rod is adjacent to the opposite corner. Often, the widths of the gaps that are formed between the outer sides of adjacent fuel assembly channels and accommodate the control rods and instrumentation tubes are also different. Therefore, the fuel assembly may often be divided into two halves by a diagonal, with fuel rods in one half having a significantly greater tendency toward a transition to boiling than the fuel rods of the other half. It is therefore advantageous for this one half to be cooled more strongly by additionally passing some of the coolant into this one half.

The offset configuration results in corresponding eccentricity in the fuel assembly, which partially compensates such inhomogeneity and—particularly if the length and distribution of the shortened fuel rods is selected appropriately—also ensure sufficient cooling and favorable void coefficients.

In accordance with an added feature of the invention, the fuel assembly channel has opposite corners, a center axis, and diagonals defined between pairs of two opposite corners of the fuel assembly channel. The coolant tube has a center axis offset in a direction of one of the diagonals with respect to the center axis of the fuel assembly channel.

In accordance with an additional feature of the invention, the diagonals include a first diagonal and a second diagonal perpendicular to the first diagonal. The center axis of the coolant tube lies on a first side of the second diagonal, and the fuel rods disposed at an edge of the regular square pattern are at a shorter distance from a wall of the fuel assembly channel on the first side of the second diagonal than the fuel rods disposed on a second side of the second diagonal.

In accordance with another feature of the invention, the fuel assembly channel has opposite corners, walls, a center axis, and a diagonal defined between a pair of two opposite corners of the fuel assembly channel. The regular square pattern is offset with respect to the center axis of the fuel assembly channel, in a direction of the diagonal, in such a manner that the fuel rods disposed at an edge of the regular square pattern on a first end of the diagonal are each at a greater distance from one of the walls of the fuel assembly channel than the fuel rods disposed at the edge of the regular square pattern on a second end of the diagonal.

In accordance with a further feature of the invention, there is disposed a larger number of the shorter fuel rods in a first half of the cross section of the fuel assembly channel, which is disposed symmetrically with respect to the second diagonal, than in a second half of the cross section of the fuel assembly channel. And the center axis of the coolant tube lies on that side of the second diagonal, on which the larger number of the shorter fuel rods is situated.

In accordance with another added feature of the invention, a plurality of the shorter fuel rods are disposed directly next to the coolant tube and reside in one half of the cross section of the fuel assembly channel and the cross section of the fuel assembly is symmetrical with respect to the diagonals.

In accordance with a concomitant feature of the invention, at least some of the shortest fuel rods are disposed directly adjacent to the coolant tube.

Other features which are considered as characteristic for the invention are set forth in the appended claims.

Although the invention is illustrated and described herein as embodied in a fuel element for a boiling water nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
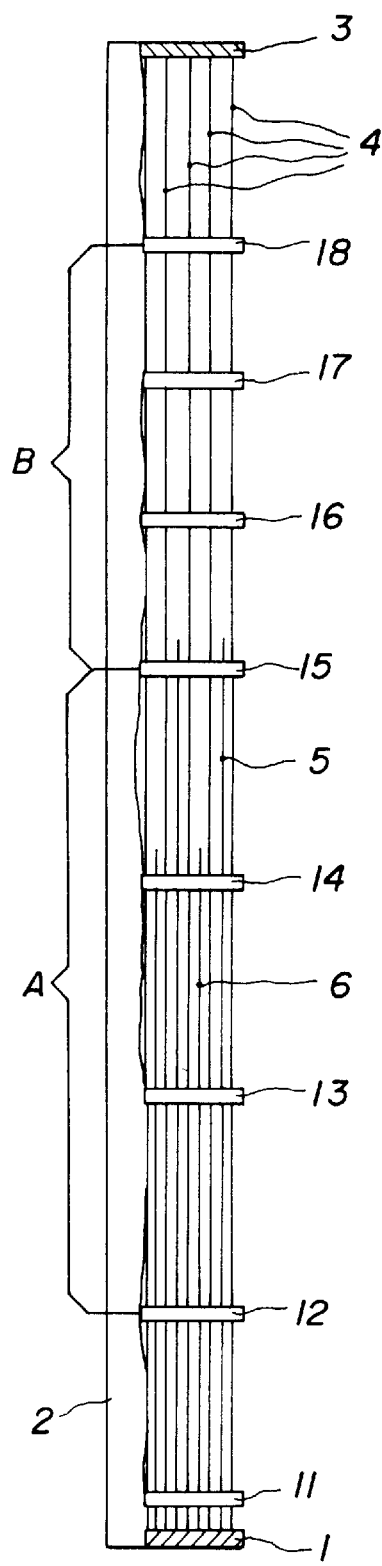
FIGS. 1 to 4 are diagrammatic, longitudinal sectional view of fuel assemblies configured in accordance with the invention.

In all the figures of the drawing, sub-features and integral parts that correspond to one another bear the same reference symbol in each case. Referring now to the figures of the drawing in detail and first, particularly, to FIG. 1 thereof, there is shown a fuel assembly containing a multiplicity of fuel rods 4 to 6 which, in the operating state, extend vertically between a lower rod-holding plate 1 and an upper rod-holding plate 3. The rod-holding plates 1 and 3 are provided with non-illustrated coolant passages. The fuel rods 4–6 are disposed parallel to one another and are clamped in spacers 11 to 18. While the fuel rods of normal length do not rest or only rest loosely on the lower rod-holding plate 1, the part-length rods are securely anchored in the rod-holding plate 1 by their lower ends. A fuel assembly channel 2 (only partially illustrated in FIGS. 1 and 3) which is open at the top and bottom encloses the bundle of fuel rods 4 to 6 and forms a closed shroud for a liquid coolant which enters through the lower rod-holding plate 1. On its way through the fuel element channel 2, the coolant—preferably water—is heated by the fuel rods 4 to 6 and begins to evaporate, so that a mixture of liquid coolant and coolant in vapor form takes up the heating capacity of the fuel rods 4–6 in an upper region of the fuel assembly.

The mixture of liquid and vapor has a larger volume than the pure liquid. In order nevertheless to avoid an undesirably high flow velocity with a low mass throughput, it is known per se to shorten some of the fuel rods, so that the clear passage cross section in the upper region of the fuel assembly channel 2 is greater than in the lower region.

In configuration terms, the spacers 11 to 18 are divided into a lower group A (12 to 15) and an upper group B (15 to 18), a distances between the spacers 12 to 15 in group A being identical to one another. It may be that just two rod lengths (full length and a single part length) will be sufficient, but two part lengths are more advantageous (and more complex). Accordingly, distances between the spacers 15 to 18 in the upper group B are shorter than in the lower group A, in particular becoming shorter the further up they are. To more precisely achieve values that are required in order to optimize a maximum transition power, the fuel rods 5 and 6 are shortened by different extents and in some cases end above the spacer 14 and in other cases end directly above the spacer 15 which forms the boundary between the spacer groups A and B.

As a result, the configuration is further away from the maximum power for transition to boiling, so that the configuration according to the invention, in configuration terms, provides an additional optimization parameter.

Figure 2:
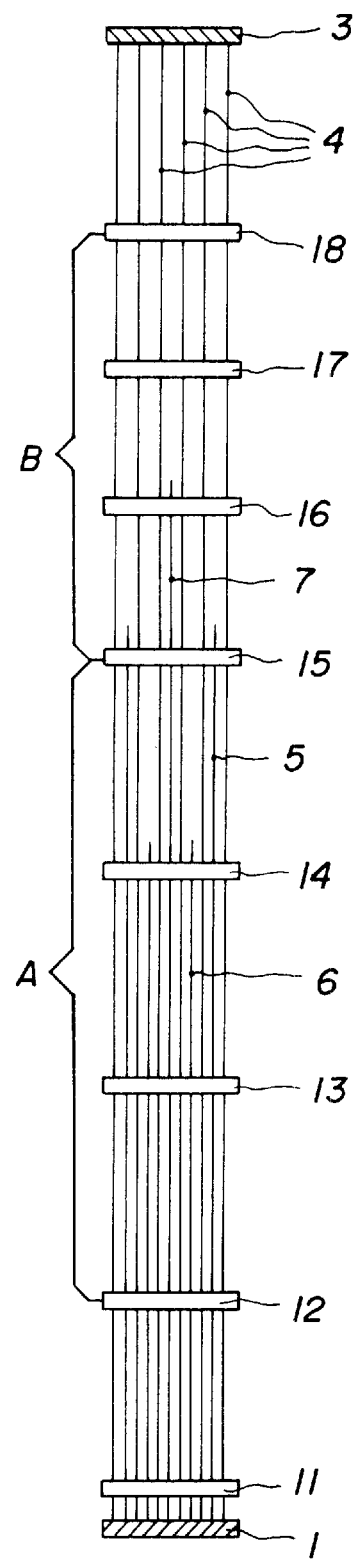
Figure 3:
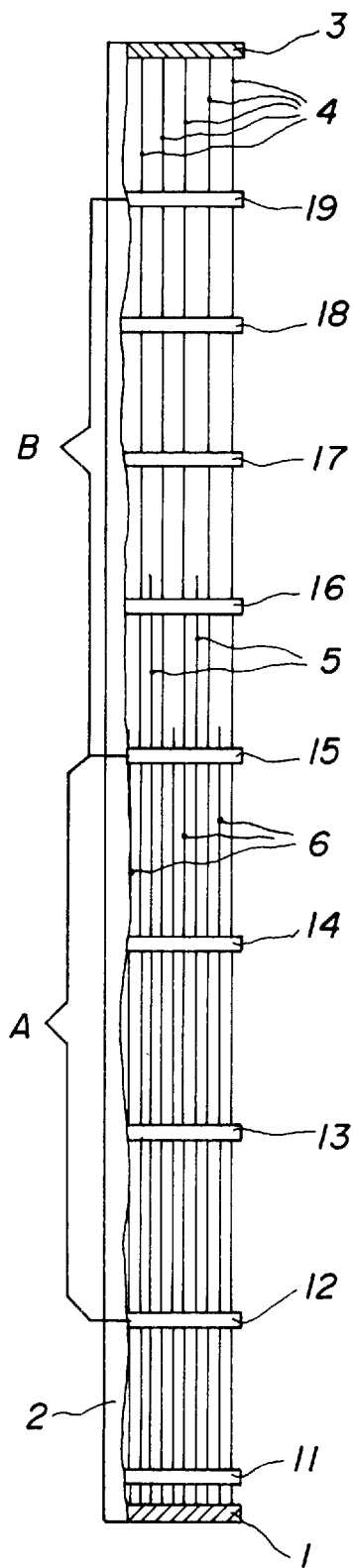
Figure 4:
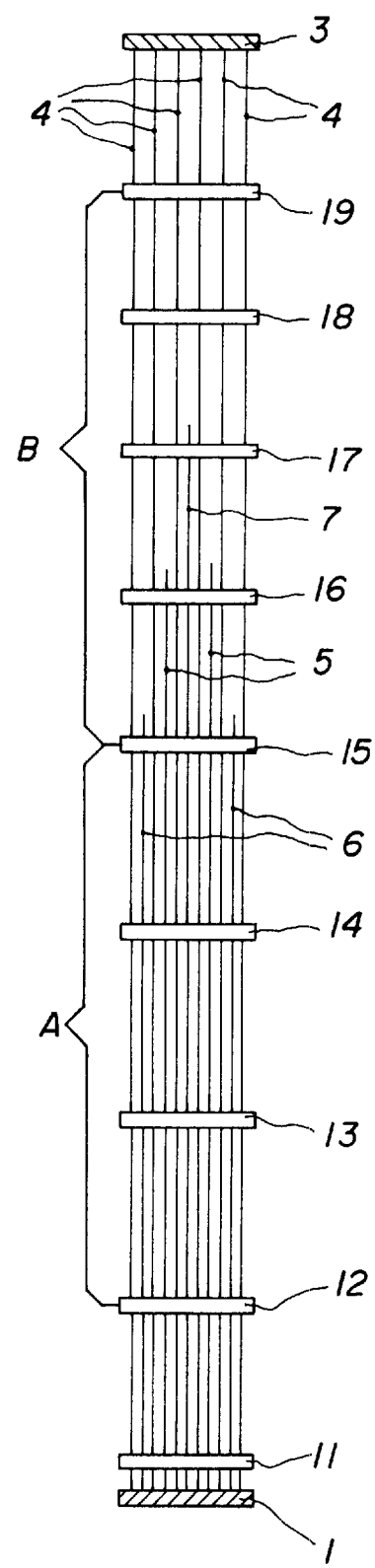

FIG. 2 likewise shows the fuel assembly with eight spacers 11 to 18 which, in configuration terms, are divided into a group A and a group B. For the sake of clarity, the fuel assembly channel 2 is not shown in FIG. 2. To provide a configuration situation which differs from that used for the configuration shown in FIG. 1, in this case fuel rods 7 are also provided. The fuel rods 7 are shortened to a lesser extent than the fuel rods 5 and 6. Further variations on fuel assemblies configured in accordance with the invention are shown in FIGS. 3 and 4. In these two solutions, in each case nine spacers 11 to 19 are provided, three different fuel rod lengths being used in FIG. 3, as in FIG. 1, and four different fuel rod lengths being used in FIG. 4, as in FIG. 2.

FIGS. 1 to 4 in each case show only one of, for example, 9 to 11 rows of fuel rods positioned one behind the other, all of which can be differently equipped with fuel rods of different lengths.

All the above measures together or on their own allow the maximum power for transition to boiling to be optimized over a wide range.

The configurations shown in FIGS. 1 to 4 are advantageous in particular because they allow unrestricted measures for segregating the liquid phase and the vapor phase in the upper region of the fuel assembly. Devices on the spacers 11 to 19, which are illustrated in FIGS. 5 and 6, are used for this purpose.

Figure 5:
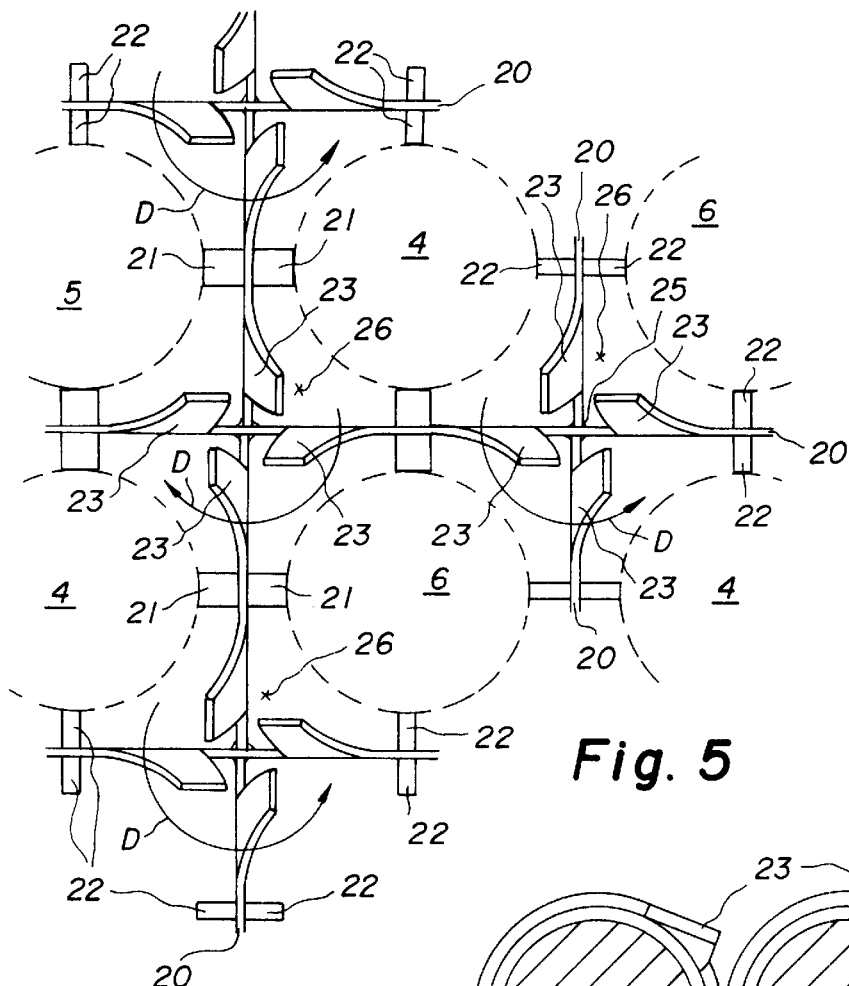
FIG. 5 is an illustration of a spacer with square mesh openings.

FIG. 5 shows, on a greatly enlarged scale, one of the spacers 11 to 19 which contains metal strips 20 which cross one another at right angles and penetrate through one another. The metal strips 20 form approximately square mesh openings for accommodating the fuel rods 4 to 7 which are clamped securely in mesh openings by lugs 21 and springs 22. As well as crossing points of the metal strips 20, in each case upwardly directed, laterally bent-off sheet-metal vanes 23 are provided, of which in each case those which are disposed next to the same crossing location 25 act in the same direction on a partial flow of the coolant which is flowing through the spacers 11 to 19 parallel to the fuel rods 4 to 7, so that a turbulent impulse D is imparted to a partial flow 26. The resultant rotary movement generates centrifugal acceleration in the partial flow 26, which forces the liquid phase of the coolant onto the fuel rods 4 to 7 and increases the cooling of these rods.

Figure 6:
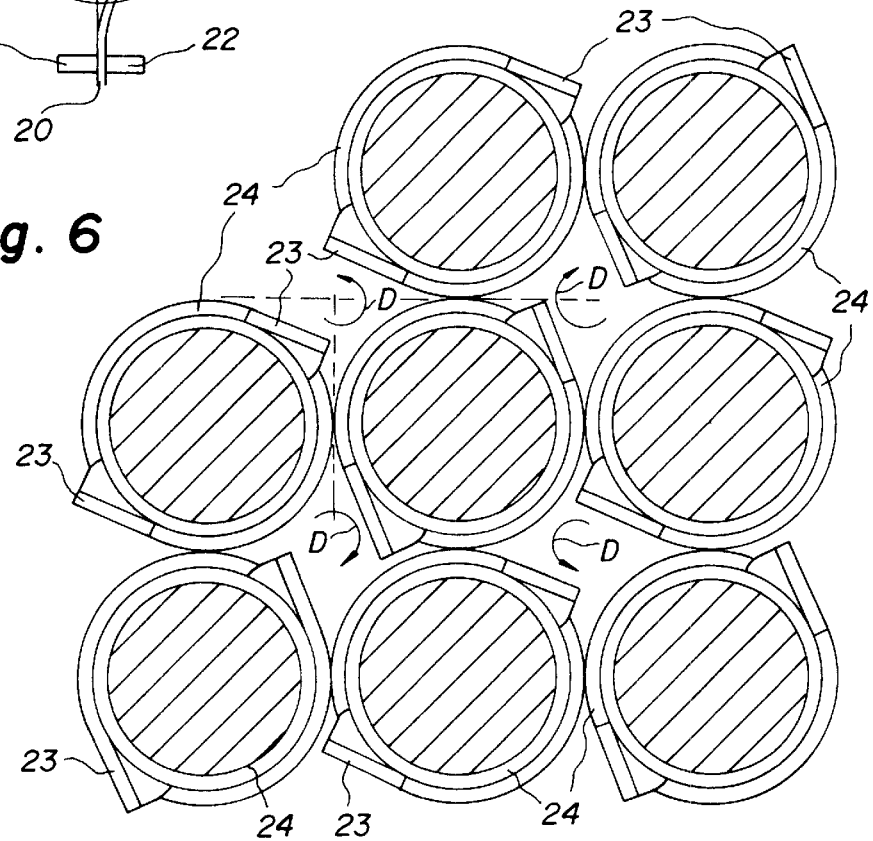
FIG. 6 is an illustration of the spacer with round mesh openings for accommodating fuel rods.

In principle, the spacer as shown in FIG. 6, in which the mesh openings which are provided to receive the fuel rods 4 to 7 are formed by hollow cylindrical sleeves 24, which likewise bear the sheet-metal vanes 23 and impose the turbulent impulse D on the partial flow 26 of coolant flowing past them, acts in the same way.

The vanes 23 shown are provided beneath the very top spacer on some (preferably all) spacers 23 belonging to group B, but are not present in group A or are only much smaller in this group. In this way, the hydraulic stability is increased, since compared to the upper part the pressure drop in the lower part of the fuel assembly should not be too low. It is also possible, with a view to achieving a low pressure loss in the upper part B, to dispense with springs, lugs or similar holding elements for the fuel rods on one or more spacers (e.g. at position 17 in FIGS. 1 to 4).

FIGS. 5 and 6 show a spacer region, the mesh openings of which all have in each case one fuel rod passing through them (except for the positions which are taken up by a water tube). However, above the part-length fuel rods there are mesh openings through which no fuel rod passes. In this case, the configuration of the vanes 23 is advantageously unchanged, and at any rate the vanes still do not project into the region of the area which lies in a rectilinear continuation of the part-length fuel rods illustrated, i.e. into the area which is formed above the part-length fuel rods. However, springs, lugs or similar supports for the fuel rods may be absent in these mesh openings.

In boiling water fuel assemblies, a configuration with at least one coolant tube is advantageous, in order to ensure that sufficient liquid moderator (cooling water) is present in the center of the fuel assembly even in the vapor/liquid zone of the fuel assembly. This is precisely the effect achieved by fuel rods whose length is shortened to from half to ⅔ of the normal fuel rod length. Hitherto, it has been assumed that, in the regular pattern in which the fuel rods are distributed across the cross section of the fuel assembly, all positions that are adjacent to the coolant tube configuration or a part-length fuel rod must be occupied by fuel rods of full length. The part-length fuel rods PL are disposed according to this rule in FIGS. 7 and 8. However, it is advantageous if at least a plurality of fuel rods which are directly adjacent to the coolant tube configuration are occupied by shortened fuel rods, as illustrated using fuel rods PL' in FIGS. 7 and 8.

Figure 7:
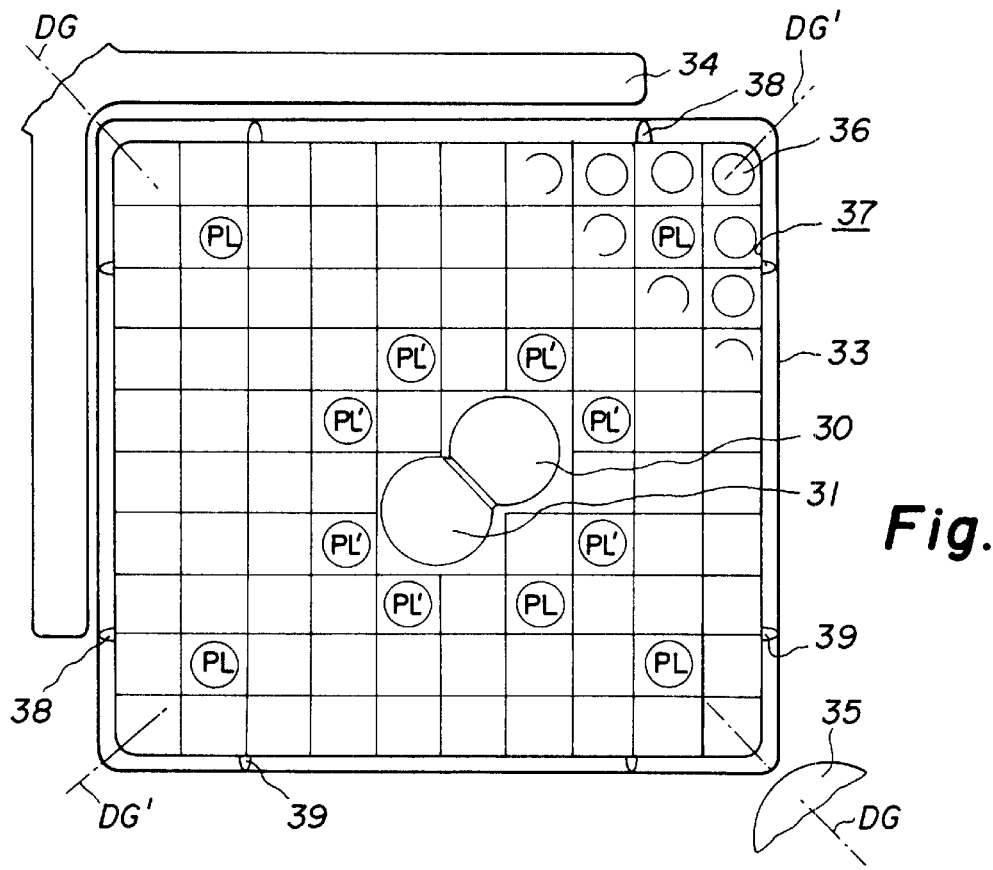
FIGS. 7 and 8 are cross-sectional view through two eccentrically constructed fuel assemblies.
Figure 8:
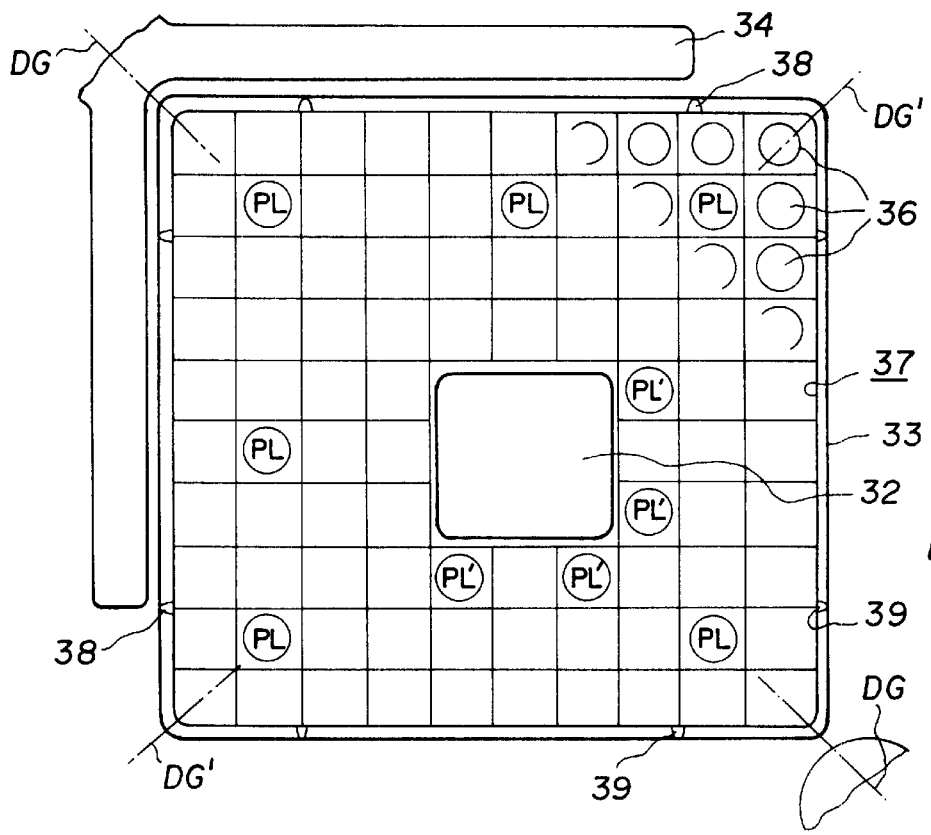

FIG. 7 shows an example with two D-shaped tubes 30, 31 as the coolant tube configuration 30, 31, while FIG. 8 shows a single coolant tube 32 which is square in cross section as the coolant tube configuration. In both cases, the coolant tube configuration 30–32 covers a plurality of fuel rod positions and there is no fuel rod in the center of the fuel assembly.

In a reactor core, a corner of a fuel rod channel 33 serves as a guide for a cross-shaped control rod 34, while the diametrically opposite corner is adjacent to an instrumentation tube 35 for measuring probes. This configuration of the measuring probes 35 and the control rod 34 in the gaps between outer surfaces of adjacent fuel assembly channels causes a relatively great width of the water-filled gaps, the gaps that carry the control rods often being wider than the other gaps. This leads to an uneven distribution of absorption material, moderator and fuel and therefore to inhomogeneity in the neutron flux and the power and burnup of the fuel rods. To achieve good utilization of the fuel at a sufficient distance from the power for transition to boiling, i.e. cooling which is adapted to the inevitable inhomogeneity, it is advantageous if the coolant tube configuration is not central, but rather is offset diagonally away from the control rod toward the opposite corner. This is achieved simply if the coolant tube configuration 30–32 is positioned correspondingly eccentrically in the pattern of the fuel rods.

FIGS. 7 and 8 show some of the fuel rods 36 of full length and the webs of spacers 37, which are held at a predetermined distance from the inner surfaces of the fuel assembly channel 33 by suitable distancing elements 38, 39 which are disposed on the outer web of the spacers. FIGS. 7 and 8 show that advantageously the entire pattern of fuel rods disposed around the coolant tube configuration is also held in the same eccentric configuration in the channel. Accordingly, the distancing elements 38 produce a wider gap between the outer web of the spacer and the channel inner surface than the distancing elements 39.

Furthermore, FIG. 8 shows that the shortened fuel rods are also advantageously distributed in a similarly eccentric manner across the fuel assembly cross section. A diagonal DG indicates the direction in which the coolant tube configuration and the entire pattern of fuel rods are offset with respect to the center axis of the fuel assembly channel. In the diagonal half of the channel cross section which is disposed symmetrically about the diagonal DG and is adjacent to the instrumentation tube 35 (i.e. is delimited by the second diagonal DG' and includes at least the greater part of the coolant tube configuration), there are more shortened fuel rods PL and PL' than in the other half which is disposed symmetrically about the diagonal DG and is adjacent to the control rod 34. Moreover, FIG. 8 shows that in the half which is delimited by the diagonal DG', the walls of the water passage configuration 32 are advantageously closer to the adjacent fuel rods (e.g. PG') compared to the fuel rods in the other half.

In these figures, PL denotes fuel rods which are shortened to a lesser extent than the fuel rods PL', i.e. the fuel rods PL' have the shortest length. In accordance with FIG. 8, a plurality of fuel rods which are directly adjacent to the coolant tube configuration 32 are advantageously shortened to the shortest length, and at least most of the fuel rods with the shortest length are situated in the corresponding diagonal half of the channel cross section which is adjacent to the instrumentation tube 35.

These rules relating to the configuration of the coolant tube configuration, of the fuel rods and in particular of the part-length fuel rods may advantageously be used even with boiling water fuel assemblies whose spacers are disposed at constant axial distances from one another. However, a particularly advantageous configuration results if the spacers in a lower region are at a constant distance from one another, but the spacers in the upper region are at a mean distance from one another which is shorter than the constant distance in the lower region.

We claim:

1. A fuel assembly for a boiling water nuclear reactor, comprising:

a multiplicity of fuel rods having top ends and bottom ends;

a fuel assembly channel having a top, a bottom, and openings formed therein at said top and said bottom, said fuel assembly channel enclosing said fuel rods;

spacers connected to said fuel assembly channel and supporting said fuel rods with respect to one another and on said fuel assembly channel, said spacers divided into a lower group having identical vertical distances from one another and, an upper group having vertical distances at least differing from said identical vertical distances of said lower group, a mean distance between said spacers in said upper group being smaller than a mean distance between said spacers in said lower group, some of said fuel rods being shorter fuel rods being shorter than others of said fuel rods and said shorter fuel rods ending below at least two of said spacers, and at least some of said spacers of said upper group having an upper side and vanes disposed on said upper side, said vanes bent obliquely into a flow of a coolant flowing upward between said fuel rods and imparting a turbulence to the flow of the coolant, and none of said vanes projecting into a space lying above said ends of said shorter fuel rods in a rectilinear continuation of said shorter fuel rods, said space above said ends forming an impeded flow passage extending through spacers located above said ends; and a lower rod-holding plate disposed in said fuel assembly channel causing said bottom ends of said fuel rod to lie practically at the same height as said lower rod-holding plate.

2. The fuel assembly according to claim 1, wherein said vertical distances in said upper group become shorter from a bottom upward.

3. The fuel assembly according to claim 1, wherein said spacers include a bottom spacer and a top spacer, a first distance between said bottom spacer and an adjacent next one of said spacers is not taken into consideration, and a second distance between said top spacer and an adjacent next one of said spacers is not taken into consideration.

4. The fuel assembly according to claim 1, wherein said shortest fuel rods end above said spacers disposed in a transition region from said lower group of said spacers to said upper group of said spacers.

5. The fuel assembly according to claim 1, wherein said vertical distances from spacer-to-spacer in said upper group of said spacers are decreased by 10% to 30% as compared to said vertical distances between said spacers of said lower group.

6. The fuel assembly according to claim 1, wherein:
said identical vertical distances between said spacers of said lower group are between 500 and 520 mm; and
said vertical distances between spacers of said upper group are between 350 and 410 mm.

7. The fuel assembly according to claim 1, wherein said fuels rods have at least three different lengths.

8. The fuel assembly according to claim 1, wherein all of said spacers of said lower group have metal strips disposed at right angles to one another, said metal strips penetrate through one another, form approximately square mesh openings and clamp said fuel rods which have been pushed through said square mesh openings, resiliently in a horizontal direction.

9. The fuel assembly according to claim 8, wherein said spacers disposed above said shortest fuel rods contain said metal strips disposed at right angles to one another, penetrate through one another, form said approximately square mesh openings and clamp said fuel rods which have been pushed through said mesh openings resiliently in a horizontal direction, and said spacers disposed above said shortest fuel rods having said vanes disposed next to penetration locations of said metal strips, on an upper edge of said metal strips.

10. The fuel assembly according to claim 9, wherein said vanes next to mutually adjacent ones of said penetration locations impart in each case an oppositely directed turbulence to the flow of the coolant.

11. The fuel assembly according to claim 9, wherein said vanes are four sheet-metal vanes disposed at each of said penetration locations of said metal strips.

12. The fuel assembly according to claim 1, wherein said spacers are formed of hollow cylindrical sleeves having side walls and connected to one another by said side walls, and said hollow cylindrical sleeves have upper ends and said vanes disposed at said upper ends only at said spacers belonging to said upper group.

13. The fuel assembly according to claim 1, including a coolant tube configuration containing at least one coolant tube disposed towards a center of said fuel assembly channel, said fuel assembly channel and said spacers each have a cross section being square shaped, and said multiplicity of fuel rods are disposed in a regular square pattern around said coolant tube.

14. The fuel assembly according to claim 13, wherein said fuel assembly channel has opposite corners, a center axis, and diagonals defined between pairs of two opposite corners of said fuel assembly channel, said coolant tube configuration has a center axis offset in a direction of one of said diagonals with respect to said center axis of said fuel assembly channel.

15. The fuel assembly according to claim 14, wherein said diagonals include a first diagonal and a second diagonal perpendicular to said first diagonal, said center axis of said coolant tube configuration lies on a first side of said second diagonal, and said fuel rods disposed at an edge of said regular square pattern are at a shorter distance from a wall of the fuel assembly channel on said first side of said second diagonal than said fuel rode disposed on a second side of said second diagonal.

16. The fuel assembly according to claim 13, wherein fuel assembly channel has opposite corners, walls, a center axis, and a diagonal defined between a pair of two opposite corners of said fuel assembly channel, said regular square pattern is offset with respect to said center axis of said fuel assembly channel, in a direction of said diagonal, in such a manner that said fuel rods disposed at an edge of said regular square pattern on a first end of said diagonal are each at a greater distance from one of said walls of said fuel assembly channel than said fuel rods disposed at said edge of said regular square pattern on a second end of said diagonal.

17. The fuel assembly according to claim 15, wherein a larger number of said shorter fuel rods are disposed in a first half of said cross section of said fuel assembly channel, which is disposed symmetrically with respect to said second diagonal, than in a second half of said cross section of said fuel assembly channel, and said center axis of said coolant tube configuration lies on that side of said second diagonal, on which said larger number of said shorter fuel rods is situated.

18. The fuel assembly according to claim 14, wherein a plurality of said shorter fuel rods are disposed directly next to said coolant tube configuration and reside in one half of said cross section of said fuel assembly channel and said cross section of said fuel assembly is symmetrical with respect to one of said diagonals.

19. The fuel assembly according to claim 14, wherein at least some of said shortest fuel rods are disposed directly adjacent to said coolant tube configuration.

20. The fuel assembly according to claim 6, wherein:
said identical vertical distances between said spacers of said lower group is about 512 mm; and
said vertical distances between spacers of said upper group decreases from about 400 mm to about 359 mm.

21. The fuel assembly according to claim 1, wherein:
said identical vertical distances between spacers of said lower group are between 520 and 580 mm; and
said vertical distances between said spacers of said upper group decrease from a value of between 500 and 390 mm.

22. The fuel assembly according to claim 1, wherein:
said identical vertical distances between said spacers of said lower group are about 568 mm; and
said vertical distances between said spacers of said upper group decrease from a value of between 450 mm and 320 mm.

23. The fuel assembly according to claim 22, wherein said vertical distances between said spacers of said upper group decrease from a value of 400 mm to 359 mm.

24. The fuel assembly according to claim 1, wherein each of said shorter fuel rods ends directly above a spacer which supports its upper end.

25. A fuel assembly for a boiling water nuclear reactor, comprising:
a multiplicity of fuel rods having top ends and bottom ends;
a fuel assembly channel having a top, a bottom, and openings formed therein at said top and said bottom, said fuel assembly channel enclosing said fuel rods;
spacers connected to said fuel assembly channel and supporting said fuel rods with respect to one another and on said fuel assembly channel, said spacers divided into a lower group having identical vertical distances from one another and, an upper group having vertical distances at least differing from said identical vertical distances of said lower group, a mean distance between said spacers in said upper group being smaller than a mean distance between said spacers in said lower group, some of said fuel rods being shorter fuel rods being shorter than others of said fuel rods and said shorter fuel rods ending below at least two of said spacers, and at least some of said spacers of said upper group having an upper side and vanes disposed on said upper side, said vanes bent obliquely into a flow of a coolant flowing upward between said fuel rods and imparting a turbulence to the flow of the coolant, and none of said vanes projecting into a space lying above said ends of said shorter fuel rods in a rectilinear continuation of said shorter fuel rods, said space above said ends forming an impeded flow passage extending through spacers located above said ends;

a lower rod-holding plate disposed in said fuel assembly channel causing said bottom ends of said fuel rods to lie practically at the same height as said lower rod-holding plate; and said fuel rods including shortest fuel rods and only said shortest fuel rods being anchored in said lower rod-holding plate.

26. The fuel assembly according to claim 25, wherein said spacers include a bottom spacer and a top spacer, a first distance between said bottom spacer and an adjacent one of said spacers is not taken into consideration, and a second distance between said top spacer and an adjacent one of said spacers is not taken into consideration.

27. The fuel assembly according to claim 25, wherein all of said spacers of said lower group have metal strips disposed at right angles to one another, said metal strips penetrate through one another, form approximately square mesh openings and clamp said fuel rods which have been pushed through said square mesh openings, resiliently in a horizontal direction.

28. The fuel assembly according to claim 27, wherein said spacers disposed above said shortest fuel rods contain said metal strips disposed at right angles to one another, penetrate through one another, form said approximately square mesh openings and clamp said fuel rods which have been pushed through said mesh openings resiliently in a horizontal direction, and said spacers disposed above said shortest fuel rods have said vanes disposed next to penetration locations of said metal strips, on an upper edge of said metal strips.

29. The fuel assembly according to claim 28, wherein said vanes are four sheet-metal vanes disposed at each of said penetration locations of said metal strips.

30. The fuel assembly according to claim 25, wherein said spacers are formed of hollow cylindrical sleeves having side walls and connected to one another by said side walls, and said hollow cylindrical sleeves have upper ends and said vanes disposed at said upper ends only at said spacers belonging to said upper group.

31. The fuel assembly according to claim 25, including a coolant tube configuration containing at least one coolant tube disposed towards a center of said fuel assembly channel, said fuel assembly channel and said spacers each have a cross section being square shaped, and said multiplicity of fuel rods are disposed in a regular square pattern around said coolant tube.

32. The fuel assembly according to claim 31, wherein said fuel assembly channel has opposite corners, a center axis, and diagonals defined between pairs of two opposite corners of said fuel assembly channel, said coolant tube configuration has a center axis offset in a direction of one of said diagonals with respect to said center axis of said fuel assembly channel.

33. The fuel assembly according to claim 32, wherein said diagonals include a first diagonal and a second diagonal perpendicular to said first diagonal, said center axis of said coolant tube configuration lies on a first side of said second diagonal, and said fuel rods disposed at an edge of said regular square pattern are at a shorter distance from a wall of the fuel assembly channel on said first side of said second diagonal than said fuel rods disposed on a second side of said second diagonal.

34. The fuel assembly according to claim 33, wherein a larger number of said shorter fuel rods are disposed in a first half of said cross section of said fuel assembly channel, which is disposed symmetrically with respect to said second diagonal, than in a second half of said cross section of said fuel assembly channel, and that said center axis of said coolant tube configuration lies on that side of said second diagonal, on which said larger number of said shorter fuel rods is situated.

35. The fuel assembly according to claim 32, wherein a plurality of said shorter fuel rods are disposed directly next to said coolant tube configuration and reside in one half of said cross section of said fuel assembly channel and said cross section of said fuel assembly is symmetrical with respect to one of said diagonals.

* * * * *